United States Patent Office 2,939,508
Patented June 7, 1960

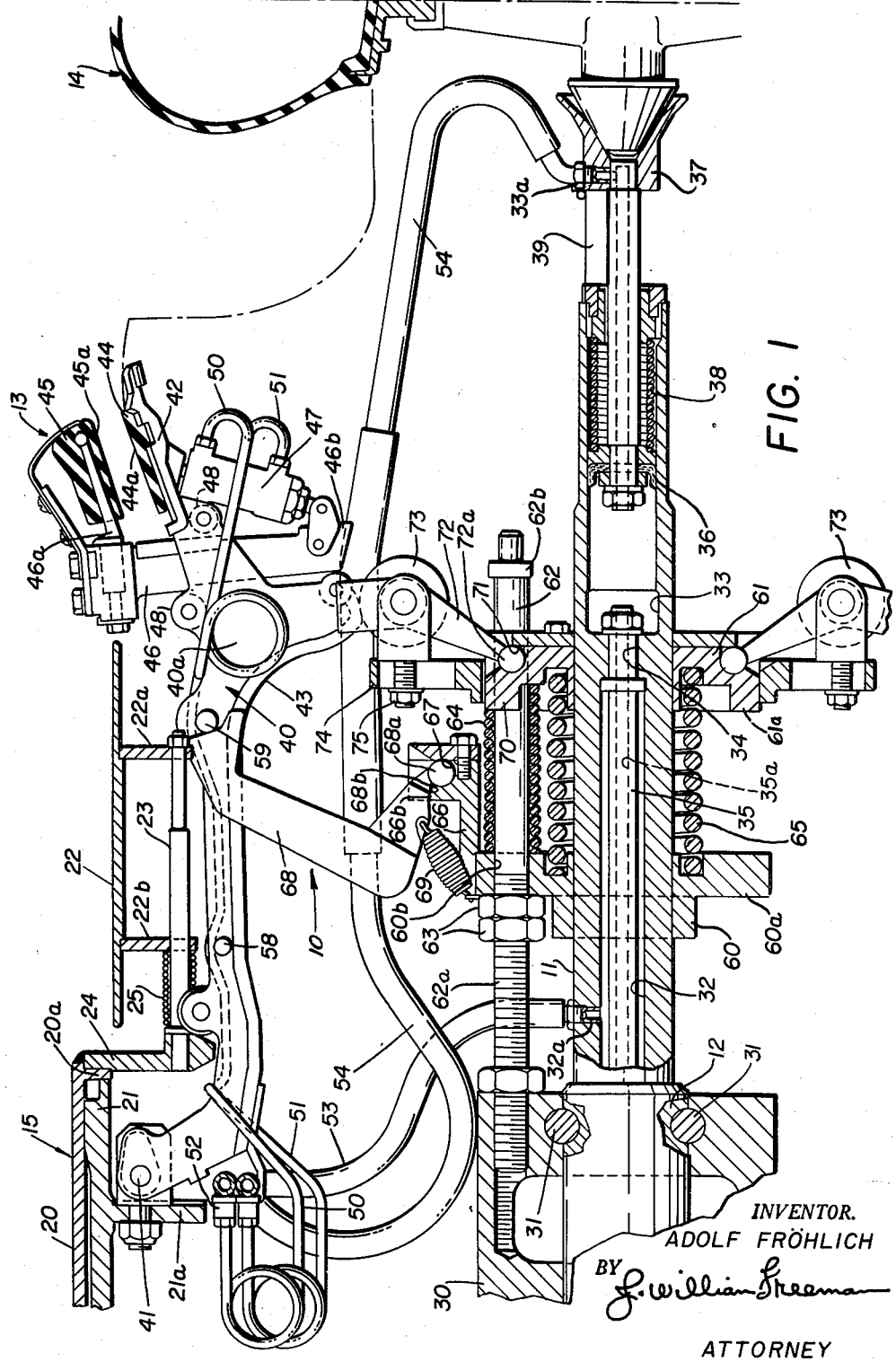

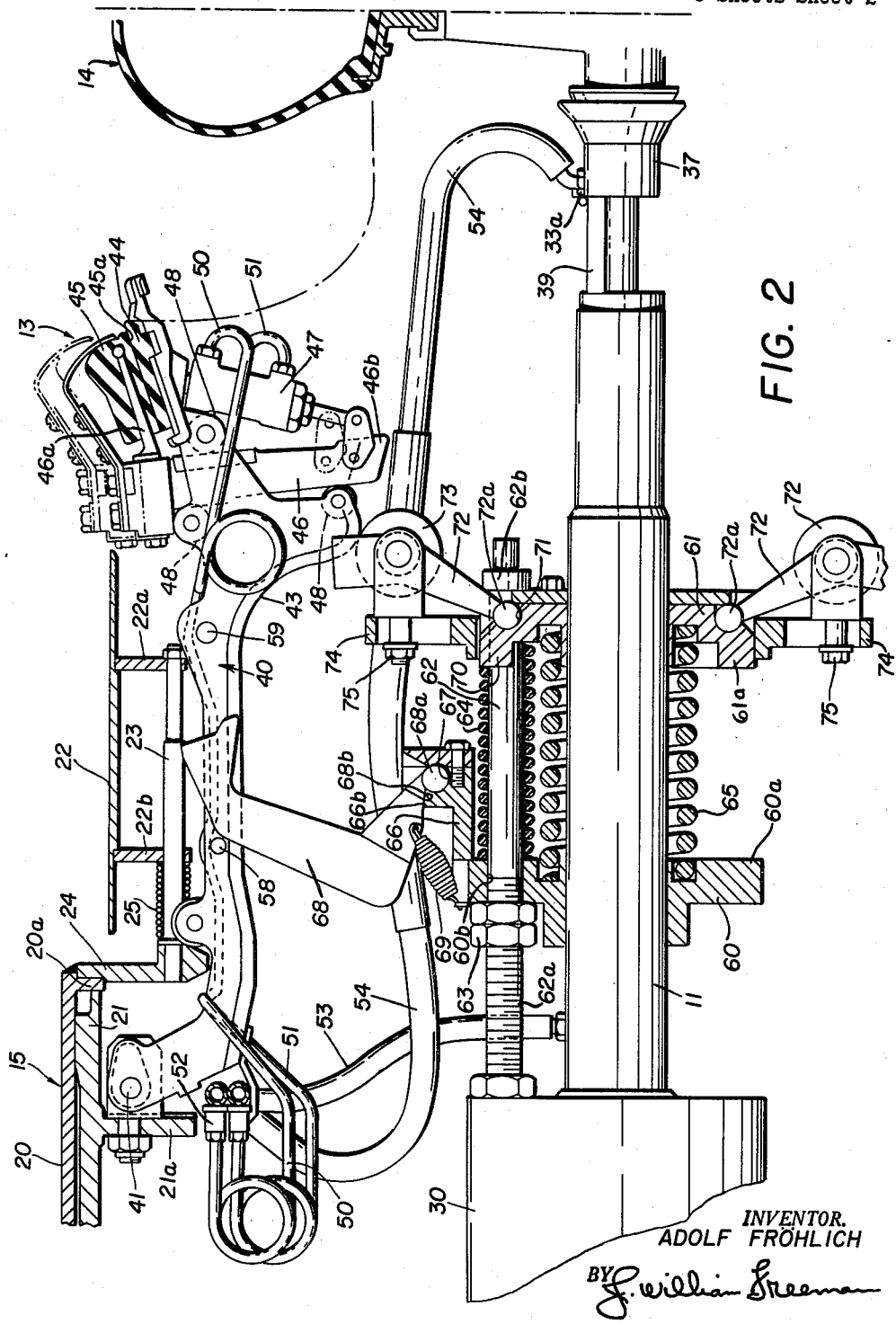

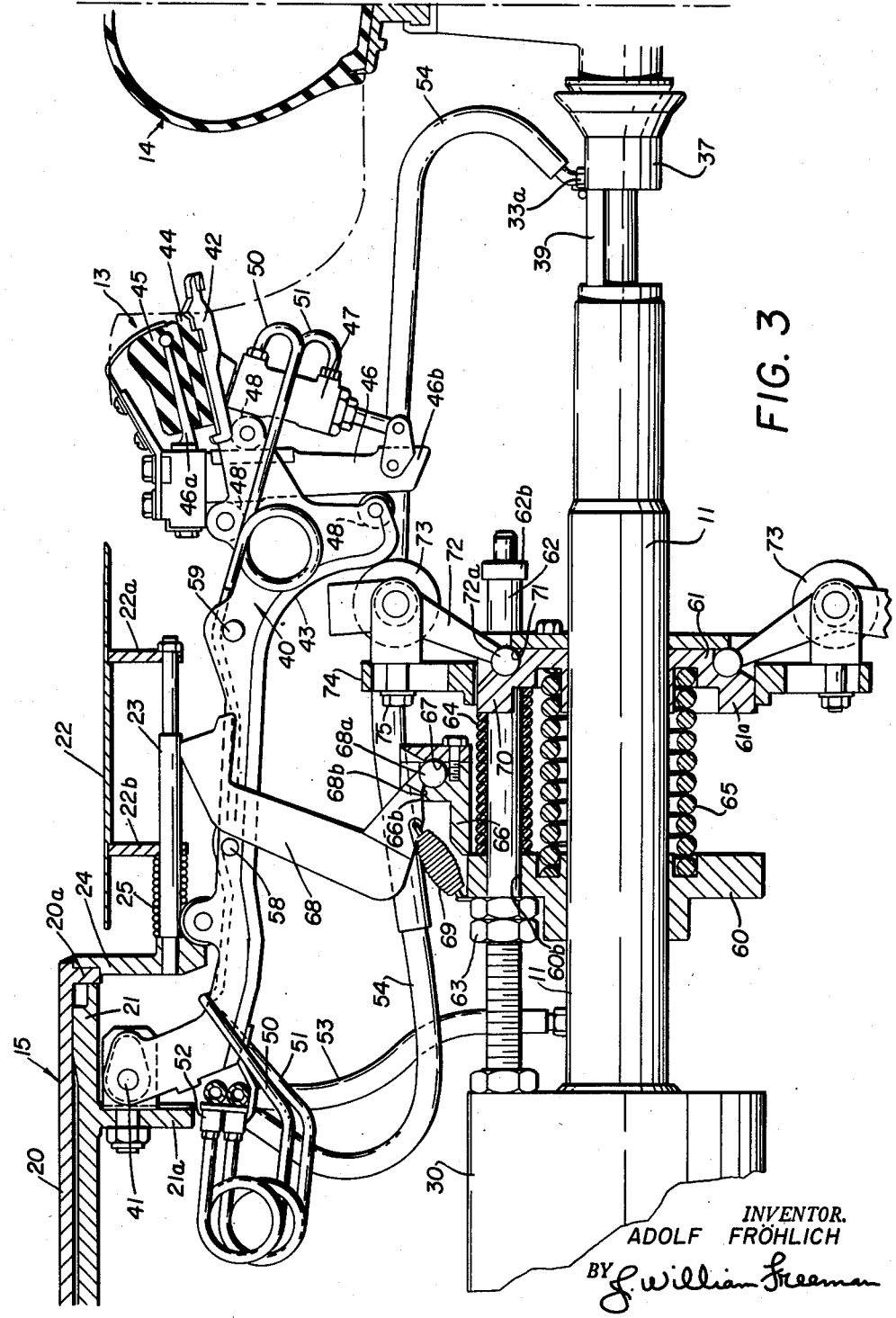

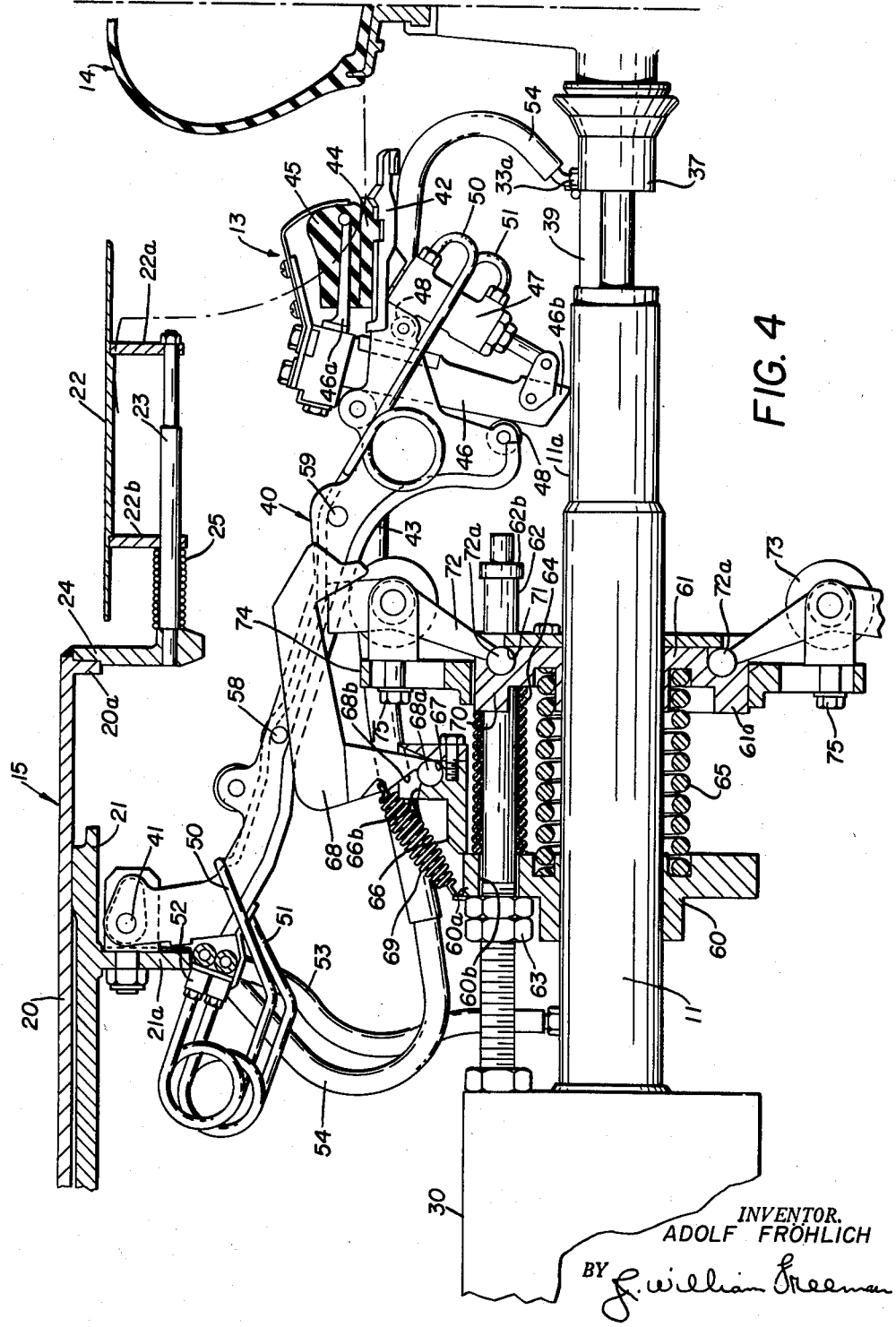

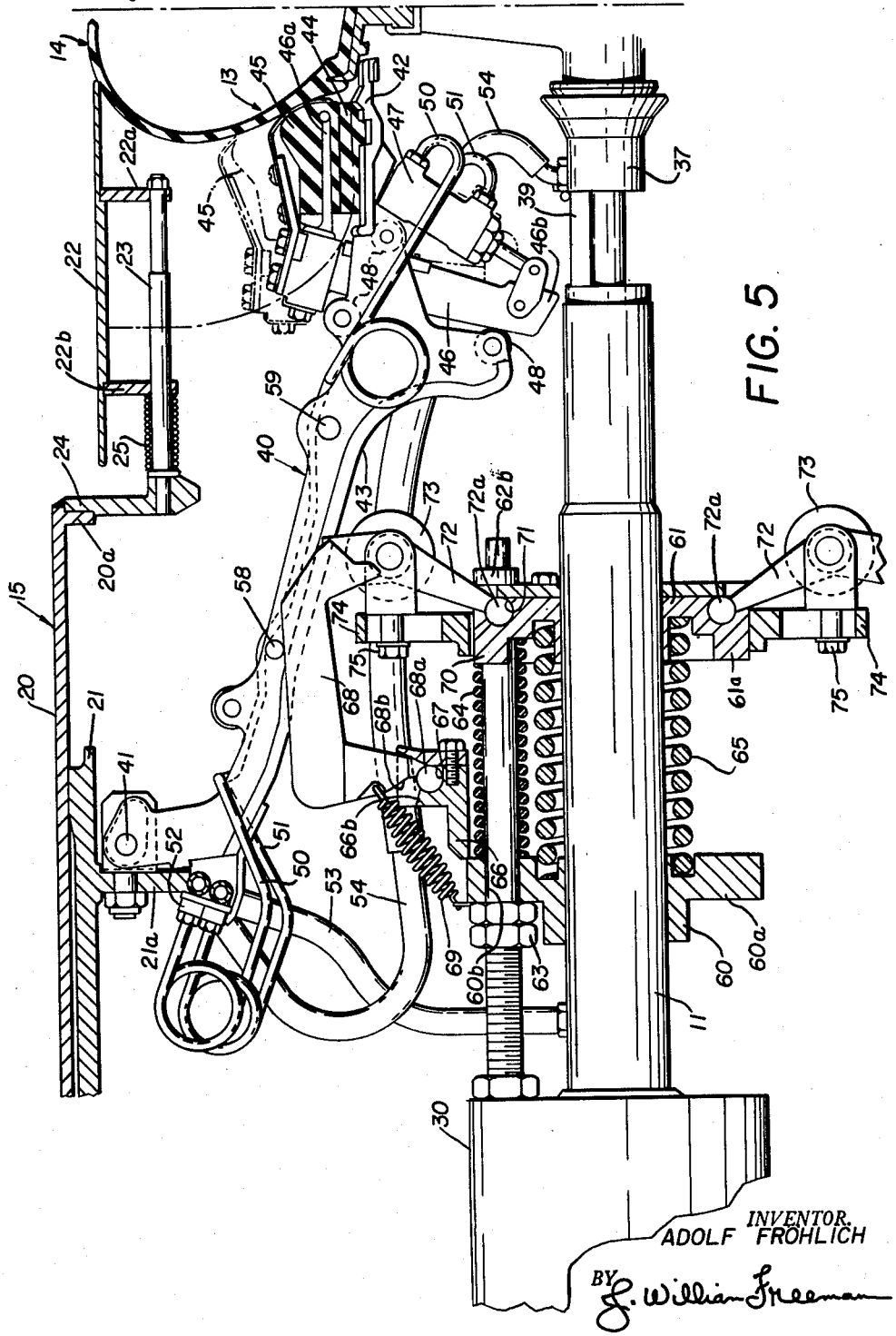

2,939,508

PNEUMATIC TIRE BUILDING APPARATUS

Adolf Fröhlich, Hannover, Germany, assignor to The Cleveland Trust Company, Cleveland, Ohio, as trustee Filed May 2, 1955, Ser. No. 505,448

6 Claims. (Cl. 154—10)

This invention relates to pneumatic tires, and in particluar, relates to improved methods and apparatus for building pneumatic tires.

For several years past, pneumatic tires have been constructed by building up a plurality of fabric plies on a cylindrical building drum to produce, in known manner, what is conventionally referred to as a "flat-built" tire of tubular construction. This uncured "flat-built" green tire was then deformed to the customary toroidal shape by the use of an air bag positioned interiorly thereof, and this uncured toroidal form was then vulcanized to produce the finished tire.

The above known prior art has been found disadvantageous in several respects; the first and foremost of which relates to the abnormal stress placed on the individual cord members of the fabric plies during the period that the "flat-built" green tire is deformed to its toroidal shape. In this regard, it is manifest that the toroidal shaped tire has a greater radial girth than the width of the fabric ply, with the result that the cords are longitudinally extended to compensate for this increased girth. From the foregoing, it is necessary that the cords employed in the fabric plies be of the type that are longitudinally extensible.

This prerequisite has substantially limited the use of certain longitudinally non-extensible cord materials such as nylon and wire, due to the fact that this type of cord, being longitudinally non-extensible, is dislodged from the surrounding green rubber of the fabric ply during the period of deformation by the air bag, with the result that use of such cords is precluded.

A further disadvantage of the known prior art relates to the creation of wrinkles in the sidewall area of the fabric ply during the aforementioned period of deformation. These wrinkles occur adjacent the bead area of the tire as a result of the diameter being less at this point than the diameter of the tread area. The obvious effect of such wrinkles from a structural standpoint is that the same cause the individual cords to be loosely folded in this area, with the result that the effectiveness thereof is impaired in this area. Additionally, these wrinkles must be smoothed out for appearance purposes, with a stitching tool, the use of which sometimes results in premature, inadvertent damage to the cord members.

From the foregoing, it appears manifest that the known prior art methods of pneumatic tire construction result in the creation of non-uniform stress in the individual fabric cords of the pneumatic tire. These stresses, in the form of longitudinal tension, are extremely severe in certain areas, while being nonexistent in other areas. The overal result of such abnormality is a pneumatic tire having a plurality of cord members incapable of functioning in the most efficient manner.

In U.S. Patent 2,503,815, certain improved tire building apparatus was set forth that was intended to obviate the above difficulties. In essence, this apparatus taught the use of a retracting curvilinear movement to apply fabric plies about a centrally positioned annular building core. The purpose of the retracting curvilinear movement in this apparatus was to create uniform tension in the cord members by making the retracting curve approximate the girth of the core. In this manner, the fabric applied to the core was always under some degree of tension, with the result that tires produced by this apparatus were characterized by the presence of cord members that were under varying degrees of longitudinal tension.

In essence, the apparatus employed in the achievement of such new and improved results as above outlined, depends upon the combined radial and axial movement of two opposed circular courses of gripping elements through a fabric application cycle. This application cycle is defined by a curvilinear path of movement that features combined axial and radial movement of the individual gripping elements about the axis of the building core. In this manner, a fabric ply, positioned about a split building drum, can have the spaced edge portions thereof gripped by the respective circular courses of gripping elements so as to suspend the fabric ply about the axis of the building core upon separation of the split building drums about the common axis of the building core. When such separation has been effectuated, the gripping elements may be moved through their curvilinear path of combined axial and radial movement so as to retractingly apply the fabric ply about the building core.

One embodiment of such apparatus is illustrated in detail in my co-pending application Serial No. 465,385, filed October 28, 1954. The improved form of the invention herein disclosed is similar in many respects to the above referred to co-pending application with the exception of the construction and actuation of the retractible gripping means per se, and accordingly, reference is directed to the drawings and disclosure of the above referred to co-pending application.

Accordingly, it is the principal object of this invention to provide a tire building machine wherein fabric plies are applied over a central building core in retracting curvilinear movement, and characterized by the presence of improved means for effectuating such retracting curvilinear movement.

This and other objects of the invention will become more apparent upon a reading of the following brief specification, considered and interpreted in the light of the accompanying drawings.

Of the drawings:

Figure 1 is an elevation, partly broken away and in section and illustrating the position of one gripping element in the open position of the improved machine.

Figures 2, 3 and 4 are similar views illustrating the position of certain component parts in various stages during the fabric application cycle.

Figure 5 is a similar view of the component parts in the closed position of the machine.

Referring now to the drawings, the improved retraction control means, generally designated as 10, are mounted on a shaft extension 11 of a main spindle 12 so as to control the combined radial and axial curvilinear path of movement of gripping means 13, 13 about the axis of a building core 14 upon movement of the building drum 15, axially of the main spindle 12.

The exact nature of the manner in which the drum 15 is mounted on spindle 12 does not effect the operation of the improved retraction control means 10 as long as the drum 15 can be rotated with the spindle while additionally being capable of being shifted axially thereof. Accordingly, any type mounting meeting the dual requirement will operate satisfactorily. As an example of such mounting, reference is made to co-pending application Serial No. 465,385, filed October 28, 1954, where the manner and operation of such a mounting is fully described.

The building drum 15 is shown in the drawings as including an outer cylindrical shell 20, an inner cylindrical shell 21 and a ply-receiving shell 22, the arrangement being such that both the shells 21 and 22 are movable axially of the shell 20 for purposes to be described. To this end, the shell 21 is shown fitted interiorly of the shell 20 and is urged against flange 20a by springs (not shown), so as to normally have the depending flange 21a thereof positioned as shown in Figure 1. By like token, the shell 22 is shown mounted through rings 22a and 22b around a shaft 23 that is in turn threaded into a carrying ring 24 so that spring 25 will urge the shell 22 to the right of Figure 1 under normal conditions. This entire subassembly defining the shell 22 is secured with respect to the shell 20 as a result of ring 24 being welded or otherwise secured, to flange 20a.

With reference now to the construction of the spindle 12, the same is shown as being defined by the previously mentioned axial extension 11, as well as the drive sleeve 30 that surrounds the spindle 12, and is keyed thereto by pins 31, 31 so as to permit the drum 15 to be rotated upon rotation of the spindle 12.

For the dual purpose of supporting the core 14 and actuating the gripping means 13, 13 in a manner to be described, the extension 11 includes axial cavities 32, 33 that are interconnected by aperture 34. Additionally, a hollow pipe 35 extends axially of cavity 32 to have the central passageway 35a thereof communicate with the aperture 34, and in this manner, the cavity 33 is supplied with fluid pressure. Fluid pressure introduced into the cavity 32 may be emitted therefrom to the external surface 11a through aperture 32a. Pressurized fluid received interiorly of cavity 33 as just described operates against piston 36 to move the bell flange unit 37 to the axially extended position of Figure 1, with spring 38 urging the return to an unextended condition when no pressure is present in cavity 33. Egress of pressurized fluid from cavity 33 is through port 33a, it being apparent that a swingable block 39 can be interposed as shown in Figure 1 to retain the flange unit 37 in the extended position of Figure 1, even though there is no pressure in cavity 33.

Turning now to a description of the gripping means 13, 13 per se, it will be seen that the same are, in essence, defined by a plurality of elongated curving arms 40, 40, each of which is identical in configuration to the form illustrated in Figures 1–5 of the drawings. Accordingly, each curving arm 40 is pivotally hinged to the flange ring 21a as at 41 so that the pivotal movement of the free end 40a thereof may be controlled as a result of contact with the retracting control means 10 in a manner to be described.

To facilitate such controlled movement of each curving arm 40, the free end 40a thereof is bifurcated to define a clamping head 42 and a cam follower surface 43, the arrangement being such that an endless resilient band 44 surrounds the circularly arranged clamping heads 42, 42 to define the clamping surfaces 44a, 44a. This band 44 operates to "pull" the follower surfaces 43, 43 into contact with the control means 10.

Complete gripping action is obtained by the use of a shiftable handle 46 having a plurality of projecting fingers 46a, 46a upon which is mounted a resilient band 45 that includes clamping surfaces 45a, 45a. Additionally, this handle 46 is shown received through an appropriate aperture in the curving arm 40 so as to be vertically shiftable therewith. To the end of effectuating such shifting, a piston 47 is shown interconnecting handle end 46b with clamping head 42 so that contraction of piston 47 will separate surfaces 44a and 45a while expansion thereof will move the same into the closed clamping position of Figures 2, 3 and 4; with rollers 48, 48 guiding such relative movement of handle 46.

Control of the above indicated clamping action has been indicated as being effectuated by piston 47, and to the end of effectuating such control the same (piston 47) is actuated by fluid lines 50, 51 that respectively connect at valve 52, with supply lines 53, 54 leading respectively to cavities 32 and 33 through ports 32a, 33a. The lines 50, 51, 53 and 54 are shown as possessing a certain degree of resiliency so as to permit flexing thereof during the fabric applying operation.

For purposes to be described, each curving arm 40 includes spaced abutment lugs 58 and 59 that coact with the means 10, in a manner to be described, to aid the movement of arm 40 during the retraction cycle thereof.

Turning now to the construction of the retraction control means 10 per se, it will be seen that the same includes a pair of slide rings 60 and 61, having respective radial flanges 60a, 61a, with flange 60a being provided with an aperture 60b, while a similar aperture (not shown) is provided in flange 61a so that the respective flanges may support a circular course of appropriately spaced spindles 62, 62 that are in turn threaded into drive sleeve 30. In addition to threads 62a, 62a, each said spindle 62 includes a shoulder stop 62b that operates to limit the axial movement of ring 61. Similar restriction of the axial movement of ring 60 is facilitated by nuts 63, 63 that are threaded onto portion 62a of spindle 62 so as to adjust the tensioning in spring members 64, 65 that respectively surround spindle 62 and extension 11 so as to urge rings 60 and 61 apart.

In addition to the aforementioned component parts, the ring 60 further includes a radial support flange 66 that has a ball socket seat 67 for reception therein of the complementally shaped end 68a of a lifting arm 68. A spring 69 secured between ring 60 and arm 68 tends to radially retain the swingable arm 68 in the position of Figure 1, with the portion 68b thereof engaging the abutment 66b of flange 66 to limit the radial extent of such swinging movement.

A similar radial support flange 70 is positioned in association with ring 61, and the same (flange 70) also includes a ball socket seat 71 for receiving end 72a of support arm 72. The support arm 72 receives a cam wheel or roller 73 on the free end thereof, and for the purpose of adjusting the angularity of arm 72, an extension 74, carried by flange 70, includes an adjustment nut 75; it being apparent that turning of nut 75 will operate to move cam wheel 73 about the pivot point defined by ball socket seat 71.

*Operation of control means*

In use or operation of the improved retraction control means 10, it will be first assumed that the machine is in the open position of Figure 1, with the ply-receiving shells 22, 22 separated as a result of the drums 15, 15 having been moved axially apart. In this regard, it is to be understood that the drawings show but one-half of a representative machine, with all views illustrating the machinery to the left of the tire center line. It is, accordingly, to be understood that an opposite hand version of the machinery is provided on the opposite half of the tire so that two drums 15, 15 will be provided, as will duplicate parts of all other described portions of the invention. It will be further assumed that the units 37, 37 have been axially extended so as to support the core 14 between the spaced drums 15, 15.

In this condition the curving arm 40 will be retained in the substantially horizontal position of Figure 1 against the radial contracting force offered by bands 44 and 45, as a result of the contact of surface 43 thereof with the control means 10. This contact will operate to axially retract the ring 61 to the position of Figure 1 in spite of the opposing force afforded by springs 64, 65, and accordingly, the ring 61 may be considered as being held or suspended in this retracted condition until closing movement of drums 15, 15 occurs upon closing of the machine. Additionally, the bands 44 and 45 are shown separated as a result of the piston 47 being contracted by air supplied from cavity 33 through lines 51 and 54.

With the component parts positioned as above described, the machine may be moved from the position of Figure 1 to the position of Figure 2 by merely moving the drums 15, 15 axially of the spindle 12. During this movement from the position of Figure 1 to the position of Figure 2, it will be noted that the ring 61 has moved to the right so as to contact the shoulder stop 62b, with the force offered by the springs 64 and 65 effectuating such axial movement of the ring 61 in the absence of restraining contact between the curving arm 40 and the cam 73. It will be additionally noted that when the position of Figure 2 has been reached, the lug member 58 has also moved into the position of substantial contact with arm 68, and it will be observed that additional closing movement of the drums 15, 15 will result in the lug 58 moving the arm 68 around its pivot point, as defined by the seat 67, against the force afforded by the spring 69.

When the position of Figure 2 has been reached, the head 46a of the handle 46 will be in the position illustrated in the chain-dotted lines of Figure 2. At such time as a fabric ply (not shown) is positioned so that the edge portions thereof overlie the clamping surfaces 44a, 44a, the piston 47 may be extended, to result in the positioned fabric ply being clamped between the surfaces 44a and 45a for subsequent application about the core 14 upon further closing movement of drums 15, 15.

One such position during such movement is illustrated in the position shown in Figure 3 of the drawings, where the clamping means 13, 13 are positioned substantially midway in the fabric application cycle.

It will be noted that as the position of Figure 3 is reached, the ring 61 has once again been shifted axially of the spindle 62 so as to compress the springs 64 and 65. Such compression of the springs results from the contact between the cam 73 and the contoured follower surface 43; and this compressed condition will continue until the fully closed position of Figure 5 is reached.

In Figure 4 of the drawings, the gripping means 13, 13 are shown as having reached the full extent of their radial contraction; it being understood that this radial contraction as illustrated in this embodiment of the invention is being limited as a result of the contact between the surface 46b and the surface 11a of the axial extension 11. It is also to be understood that similar limitation of the contractual movement of the individual curving arms 40, 40 could be achieved by varying the width dimensions thereof so that the closed circular course thereof would operate to restrict the degree of radial contraction. It will also be noted in Figure 4 of the drawings that the lug 58 has further pivoted the arm 68 about the ball socket 67, and that the spring 69 has been further extended so as to increase the retraction force afforded thereby.

As the drums 15, 15 move from the position of Figure 4 towards the fully closed position of Figure 5, it will be seen that the contact between the surface 43 and the cam 73 will be terminated; with the result that when the device reaches the position of Figure 5 the ring 61 has moved to its full axial limit as defined by the shoulder stop 62b. It will be further noted that the arm 68 has been pivoted to the extreme condition thereof when the mechanism is in the position of Figure 5, with the result that the spring 69 at this time would be under the maximum stress.

After the fully closed condition of Figure 5 has been reached, it is manifest that another ply (not shown) may be positioned about the ply-receiving drum 22, and after such positioning, the drums 15, 15 may be separated, and after such initial separation the handle 46 may be moved from the full line position of Figure 5 to the chain-dotted line position thereof by merely actuating the piston 47 as has been previously described.

During the opening of the drums 15, 15 during this retraction cycle, it is apparent that the force offered by the extended spring 69 will operate to pivot the arm 68 counter-clockwise about the ball socket seat 67, with the result that this arm 68 will offer an auxiliary lifting force against the lug 58 to thus aid in lifting the arm 40 to the position of Figure 1 upon further separation of the drums 15, 15.

The need for such a supplementing force in the nature of an auxiliary link arm 68, diminishes as the curving arm 40 approaches the substantially horizontal position of Figure 1; and accordingly, the new and novel design of the lifting arm 68 operates to provide the maximum amount of such auxiliary lifting force during the proper cycle of operation, namely, when the drums 15, 15 are first opened from the closed position of Figure 5. As the drums 15, 15 are further separated, it is manifest that the fabric ply that is suspended on the ply-receiving shell 22 thereof, will eventually be received upon the gripping surface 44a, at which time the device may be re-clamped.

At this time, another cycle of operation, as above described, may be commenced.

It will be seen from the foregoing that there has been provided a new and novel method of controlling the radial retraction of circularly arranged gripping means to result in the more efficient application of fabric plies about a central building core.

In the preceding embodiment of the invention, the apparatus employed was described only on one side of the axis of symmetry of the tire machine. It is to be understood that similar apparatus could be positioned on the opposite side of the axis of symmetry to thus effectuate use of equivalent retracting means on both sides of the axis of symmetry of core 14.

Accordingly, other modifications of the invention may be resorted to without departing from the spirit thereof or the scope of the appended claims.

What is claimed is:

1. A pneumatic tire machine of the character described, comprising: a frame; a spindle, rotatably mounted on said frame; an annular building core; means on said spindle for supporting said core axially thereof; a ply-receiving drum, rotatably secured in axially shiftable relationship with said spindle; a circular course of elongated arms each pivoted at one end to said drum and having the opposed free end thereof shiftable radially of said spindle; integral gripping elements provided on each said free end thereof and being disposed between said drum and said spindle; and means for shifting said gripping elements both radially and axially of the common axis of said drum, said spindle, and said core; said means including an endless band, surrounding said gripping elements, whereby a radial contracting force is exerted thereagainst; a first ring concentrically mounted on said spindle in axially shiftable relationship therewith; a cam roller carried by said first ring and having a surface thereof contacting said elongated arms adjacent their free ends; and spring means operating axially of said spindle and tensionally contacting said cam roller, whereby said cam roller is urged into contact with said arm during relative axial movement of said drum and said spindle to control the radial movement thereof about said spindle; a second ring concentrically disposed around said spindle; a plurality of lifting arms pivoted to said second ring and arranged in a circular course whereby each said lifting arm will contact one said elongated arm; and means for urging said lifting arms into a radially expanded condition whereby said lifting arms will urge said elongated arms into a radially expanded condition upon contact therewith.

2. A pneumatic tire machine of the character described, comprising: a frame; a spindle, rotatably mounted on said frame; an annular building core; means on said spindle for supporting said core axially thereof; a ply-receiving drum, rotatably secured in axially shiftable relationship with said spindle; a circular course of elongated arms each pivoted at one end to said drum and having the opposed free end thereof shiftable radially of said spindle; integral gripping elements provided on each said free end thereof and being disposed between said drum and said spindle; and means for shifting said gripping elements both radially and axially of the common axis of said drum, said spindle, and said core; said means including an endless band, surrounding said gripping elements, whereby a radial contracting force is exerted thereagainst; a first ring concentrically mounted on said spindle in axially shiftable relationship therewith; a cam roller carried by said first ring and having a surface thereof contacting said elongated arms adjacent their free ends; and spring means operating axially of said spindle and tensionally contacting said cam roller, whereby said cam roller is urged into contact with said arm during relative axial movement of said drum and said spindle to control the radial movement thereof about said spindle; a second ring concentrically disposed around said spindle; a plurality of lifting arms pivoted to said second ring and arranged in a circular course whereby each said lifting arm will contact one said elongated arm; and means for urging said lifting arms into a radially expanded condition whereby said lifting arms will urge said elongated arms into a radially expanded condition upon contact therewith; said expanding force of said lifting arms varying during relative movement between said spindle and said drum whereby the same will be greater than and less than said contracting force of said band during various periods of relative movement between said drum and said spindle.

3. A pneumatic tire machine of the character described, comprising: a frame; a spindle, rotatably mounted on said frame; an annular building core; means on said spindle for supporting said core axially thereof; a ply-receiving drum, rotatably secured in axially shiftable relationship with said spindle; a circular course of elongated arms each pivoted at one end to said drum and having the opposed free end thereof shiftable radially of said spindle; integral gripping elements provided on each said free end thereof and being disposed between said drum and said spindle; and means for shifting said gripping elements both radially and axially of the common axis of said drum, said spindle, and said core; said means including an endless band, surrounding said gripping elements, whereby a radial contracting force is exerted thereagainst; a first ring concentrically mounted on said spindle in axially shiftable relationship therewith; a cam roller carried by said first ring and having a surface thereof contacting said elongated arms adjacent their free ends; and spring means operating axially of said spindle and tensionally contacting said cam roller, whereby said cam roller is urged into contact with said arm during relative axial movement of said drum and said spindle to control the radial movement thereof about said spindle; a second ring concentrically disposed around said spindle; a plurality of lifting arms pivoted to said second ring and arranged in a circular course whereby each said lifting arm will contact one said elongated arm; and means for urging said lifting arms into a radially expanded condition whereby said lifting arms will urge said elongated arms into a radially expanded condition upon contact therewith; each said lifting arm being pivotally secured at one end to said spindle in radially shiftable relationship therewith and having the free end thereof engaging at least one said elongated arm and spring means interconnecting said arm and said spindle whereby said free end of said lifting arm is under tensional contact with said elongate arm.

4. A machine for building the fabric structure of a pneumatic tire, comprising: an elongated frame; an annular building form; a spindle, having the axis thereof rotatably supported longitudinally of said frame; means for supporting said core over said frame in axially aligned relationship therewith; a ply-receiving drum, rotatably supported on said spindle and being axially shiftable with respect thereto about a common axis; a plurality of elongated arms pivoted at one end to said drums and having the remaining free ends thereof arranged in a circular course about the common axis of said spindle, said drum, and said core and being disposed between said drum and said spindle, and guide means for shifting said gripping means both axially and radially of the common axis of said drum, said spindle, and said core; said gripping means including an inner course of gripping surfaces; an outer course of gripping surfaces, and means for moving said gripping surfaces into each clamping relationship with each other; said guide means including an endless band, surrounding said gripping elements, whereby a radial contracting force is exerted thereagainst; a first ring concentrically mounted on said spindle in axially shiftable relationship therewith; a cam roller carried by said first ring and having a surface thereof contacting said elongated arms adjacent their free ends; and spring means operable axially of said spindle and tensionally contacting said cam roller, whereby said cam roller is urged into contact with said arm during relative axial movement of said drum and said spindle to control the extent of radial movement thereof about said axis; a second ring concentrically disposed around said spindle; a plurality of lifting arms pivoted to said second ring and arranged in a circular course whereby each said lifting arm will contact one said elongated arm; and means for urging said lifting arms into a radially expanded condition whereby said lifting arms will urge said elongated arms into a radially expanded condition upon contact therewith.

5. A machine for building the fabric structure of a pneumatic tire, comprising: an elongated frame; an annular building form; a spindle, having the axis thereof rotatably supported longitudinally of said frame; means for supporting said core over said frame in axially aligned relationship therewith; a ply-receiving drum, rotatably supported on said spindle and being axially shiftable with respect thereto about a common axis; a plurality of elongated arms pivoted at one end to said drums and having the remaining free ends thereof arranged in a circular course about the common axis of said spindle, said drum, and said core and being disposed between said drum and said spindle, and guide means for shifting said gripping means both axially and radially of the common axis of said drum, said spindle, and said core; said gripping means including an inner course of gripping surfaces; an outer course of gripping surfaces, and means for moving said gripping surfaces into each clamping relationship with each other; said guide means including an endless band, surrounding said gripping elements, whereby a radial contracting force is exerted thereagainst; a first ring concentrically mounted on said spindle in axially shiftable relationship therewith; a cam roller carried by said first ring and having a surface thereof contacting said elongated arms adjacent their free ends; and spring means operable axially of said spindle and tensionally contacting said cam roller, whereby said cam roller is urged into contact with said arm during relative axial movement of said drum and said spindle to control the extent of radial movement thereof about said axis; a second ring concentrically disposed around said spindle; a plurality of lifting arms pivoted to said second ring and arranged in a circular course whereby each said lifting arm will contact one said elongated arm; and means for urging said lifting arms into a radially expanded condition whereby said lifting arms will urge said elongated arms into a radially expanded condition upon contact therewith; said expanding force of said lifting arms varying during relative movement between said spindle and said drum whereby the same will be greater than and less than said contracting force of said band during various periods of relative movement between said drum and said spindle.

6. A machine for building the fabric structure of a pneumatic tire, comprising: an elongated frame; an annular building form; a spindle, having the axis thereof rotatably supported longitudinally of said frame; means for supporting said core over said frame in axially aligned relationship therewith; a ply-receiving drum, rotatably supported on said spindle and being axially shiftable with respect thereto about a common axis; a plurality of elongated arms pivoted at one end to said drums and having the remaining free ends thereof arranged in a circular course about the common axis of said spindle, said drum, and said core and being disposed between said drum and said spindle, and guide means for shifting said gripping means both axially and radially of the common axis of said drum, said spindle, and said core; said gripping means including an inner course of gripping surfaces; an outer course of gripping surfaces, and means for moving said gripping surfaces into each clamping relationship with each other; said guide means including an endless band, surrounding said gripping elements, whereby a radial contracting force is exerted thereagainst; a first ring concentrically mounted on said spindle in axially shiftable relationship therewith; a cam roller carried by said first ring and having a surface thereof contacting said elongated arms adjacent their free ends; and spring means operable axially of said spindle and tensionally contacting said cam roller, whereby said cam roller is urged into contact with said arm during relative axial movement of said drum and said spindle to control the extent of radial movement thereof about said axis; a second ring concentrically disposed around said spindle; a plurality of lifting arms pivoted to said second ring and arranged in a circular course whereby each said lifting arm will contact one said elongated arm; and means for urging said lifting arms into a radially expanded condition whereby said lifting arms will urge said elongated arms into a radially expanded condition upon contact therewith; each said lifting arm being pivotally secured at one end to said spindle in radially shiftable relationship therewith and having the free end thereof engaging said elongate arm in lifting contact therewith; and spring means interconnecting said arm and said spindle whereby said free end of said lifting arm is under tensional contact with said elongate arm.

References Cited in the file of this patent

UNITED STATES PATENTS

| | | |
|---|---|---|
| 2,313,035 | Breth | Mar. 9, 1943 |
| 2,503,815 | Frohlich | Apr. 11, 1950 |

FOREIGN PATENTS

| | | |
|---|---|---|
| 152,039 | Austria | Dec. 27, 1937 |